July 7, 1931. C. E. SMITH Re. 18,119

PIPE COUPLING

Original Filed March 25, 1927

INVENTOR.
Charles E. Smith

BY Wm. Thorn

ATTORNEY.

Reissued July 7, 1931 Re. 18,119

UNITED STATES PATENT OFFICE

CHARLES E. SMITH, OF THREE RIVERS, TEXAS, ASSIGNOR TO HINDERLITER TOOL COMPANY, A CORPORATION OF OKLAHOMA

PIPE COUPLING

Original No. 1,682,635, dated August 28, 1928, Serial No. 178,385, filed March 25, 1927. Application for reissue filed June 9, 1930. Serial No. 460,070.

My invention relates to pipe couplings and more particularly to a device of that character for connecting sections of pipe or tubing through which fluid is conducted, the principal object of the invention being to effectively seal the connection between the coupling and pipe sections for preventing leakage of fluid at the coupling.

In accomplishing this object I have provided improved details of structure, the preferred forms of which are illustrated in the accompanying drawings, wherein.

Figure 1:
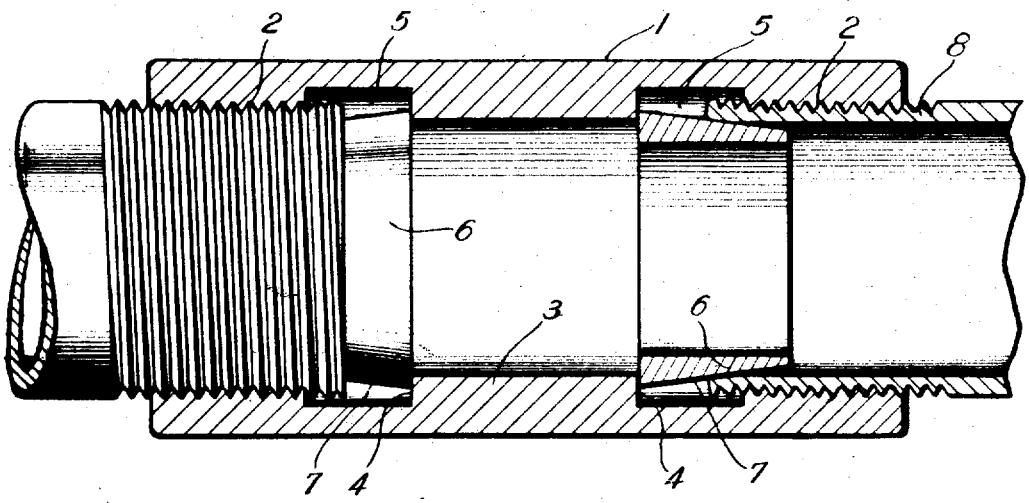
Fig. 1 is an elevational view of one form of my improved coupling showing the coupling sleeve and one of the pipe sections and joint rings in central longitudinal section.
Figure 2:
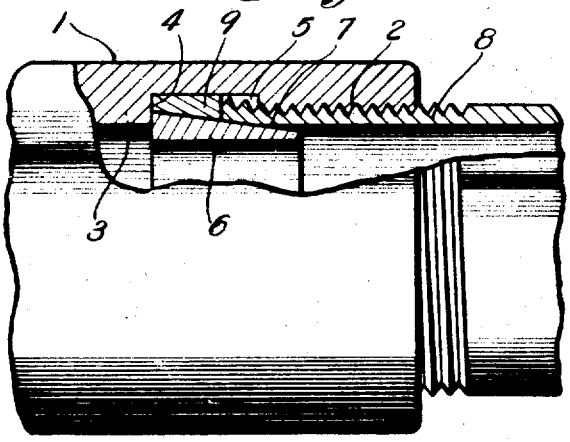
Fig. 2 is an elevational view of part of the coupling and one of the pipe sections partly broken away and in central longitudinal section, illustrating packing at the joint.

Referring more in detail to the drawings:

1 designates the coupling sleeve, having internal screw threads 2 at its opposite ends, and an internal flange 3 between and spaced from the threaded portions 2 forming outwardly facing shoulders 4, the inner surface of the sleeve being preferably countersunk between the threaded sections and shoulders to provide annular grooves 5 for containing packing, as presently described.

Seated on the shoulders 4 are rings 6 of rigid material, having tapered outer peripheries 7, and preferably of a length to extend beyond the inner terminals of the threaded portions 2 at the ends of the sleeve 1, and of a diameter at their outer ends to be received within the ends of pipe or tube sections 8 when the latter are threaded into the coupling sleeve, the diameter of the rings increasing from their outer ends to their inner ends in such degree that as the ends of the pipe sections project beyond the threaded portions of the sleeve they engage the tapered peripheries of the rings and are expanded into the grooves 5 to seat the threaded portions of the pipe sections tightly in the threaded portions of the sleeve, and thereby effectively seal the joint between the pipe sections and sleeve and lock the pipe section to the sleeve.

In order to further insure effective sealing of the joint I locate packing rings 9 of expansible material on the shoulders 4 between the rings 6 and the wall of the coupling sleeve so that when the pipe sections are threaded into the coupling sleeve the ends of the pipe sections engage the ends of the packing rings and compress the latter between the sleeve and rings to effectively seal the joint between the pipe sections and sleeve. It is apparent that with such arrangement the rings 6, being of rigid material, retain the packing rings against inward displacement so that end thrusts of the pipe sections against the rings compress the latter laterally and longitudinally to seal the joint along the surfaces of the respective parts and thereby prevent leakage of fluid through the joint and between the threaded connection between the pipe sections and coupling sleeve.

With the pipe sections connected as described, fluid may be forced through the coupled pipe sections under pressure without loss of fluid through the joint.

What I claim and desire to secure by Letters Patent is:

1. In a pipe coupling, a connecting member having an interior annular shoulder, a compressible packing ring seated on said shoulder and a relatively rigid keeper ring seated on the shoulder within the packing ring for restraining lateral expansion of the packing ring responsive to end thrust of a pipe section, threaded into the connecting member and projected between the opposed walls of the keeper ring and connecting member.

2. A pipe coupler having its bore threaded from the ends thereof and having annular pockets at the terminals of the threads, and hollow frusto conical expanders formed independent of the coupling and designed to be arranged therein and have their widened ends contact with the inner walls of the pockets and to project into the threaded portion of the bore of the coupler and engage with pipes which are screwed in the coupler.

3. A coupler for the threaded ends of metal pipes, comprising a member having its bore threaded at the ends thereof, and having annular pockets at the terminals of the threads which provide inner straight shoulders, a removable pipe expander contacting the shoulder of each pocket, each of said expanders being of hollow frusto conical formation, the reduced ends of which being extended into the threaded portions of the bore of the coupler, and whereby a pipe screwed in the coupler will have the walls of its bore contacted by the said expanders to flare or expand the pipe ends and project the same into the pockets.

4. A pipe coupler having its bore threaded from the ends thereof and having annular pockets at the terminals of said threads and hollow frusto conical expanders each contacting with the inner walls of one pocket and projecting into the threaded portion of the bore of the coupler, said threaded bore designed to have screwed therein pipe members whose bores are contacted by the frusto conical expanders, and compressible rings on the expanders contacted by the pipe members designed to be forced thereby against the inner walls of the pockets and to be compressed into said pockets.

5. In a pipe coupling, a threaded connecting member having an interior annular recess, a packing unit within said recess including a compressible body, and a relatively rigid lining member abutting one wall of said recess in restraining relation within said body.

6. In a pipe coupling, a threaded connecting member, an interior annular recess in said connecting member, a packing unit within said recess including a compressible body engageable by the end of the pipe section, and a relatively rigid lining abutting one wall of said recess in restraining relation with said body for effecting compression of said body between the lining and the wall of the connecting member in response to thrust of the pipe section on said body.

7. In a pipe coupling, a connecting member having an interior annular shoulder, a packing ring within said connecting member and abutting said shoulder, a relatively rigid member having one end thereof abutting said shoulder and being tapered to form a wall opposed to the wall of the connecting member, and means to compress said ring between said walls and said shoulder.

8. In a pipe coupling, a connecting member having an interior annular shoulder, a sealing unit within said connecting member including a packing ring and a relatively rigid member within the packing ring abutting said shoulder and having a wall opposed to the wall of the connecting member, one of said walls being tapered, and means to compress said packing ring between said walls and said shoulder.

9. In a device of the character described, a member for coupling two sections of pipe, said member having threaded ends, and having interior annular recesses of greater diameter than the base of the threads within said ends, a shoulder in said recess, and means abutting said shoulder for forcing the end of a pipe outwardly into said recess to prevent unscrewing of the pipe.

10. In a device of the character described, a member for coupling two sections of pipe, said member having threaded ends, and having interior annular recesses of greater diameter than the base of the threads within said ends, a shoulder in said recess, and a hollow cylindrical member having an outside tapered face abutting said shoulder for forcing the end of a pipe outwardly as the same is being screwed into said recess to prevent unscrewing of the pipe.

11. In a pipe coupling, a hollow member having internal screw threads extending inwardly a distance from each end, an internal flange intermediate the ends of said member, said member also having enlarged interior recesses formed on each side of said flange, and hollow cylidrical members having outside tapered faces positioned in said casing and adapted to have their reduced ends enter pipes while being secured in said member, their opposite ends adapted to abut the flange and flare the ends of the pipes outwardly in said recesses.

12. In a pipe coupling, a connecting member having an interior annular shoulder at a distance from its ends, a relatively rigid keeper ring located in said member, a packing ring surrounding said keeper ring and resting on said seat, said keeper ring restraining lateral expansion of the packing ring responsive to end thrust of a pipe section threaded into the connecting member, and projecting between the opposed walls of the keeper ring and connecting member.

13. In a pipe coupling, a connecting member internally threaded for a distance from each end, interior annular shoulders formed in said member intermediate its ends, a packing ring located on each shoulder, and a keeper ring extending into each of said packing rings whereby lateral expansion of said packing rings is prevented when end thrust is exerted thereon.

In testimony whereof I affix my signature.

CHARLES E. SMITH.